United States Patent
Mutalik et al.

(10) Patent No.: US 7,206,961 B1
(45) Date of Patent: Apr. 17, 2007

(54) PRESERVING SNAPSHOTS DURING DISK-BASED RESTORE

(75) Inventors: Madhav Mutalik, Southborough, MA (US); Dennis Thomas Duprey, Raleigh, NC (US); Robert F. Goudreau, Jr., Cary, NC (US); Charles Christopher Bailey, Carrboro, NC (US)

(73) Assignee: EMC Corporation, Hopkinton, MA (US)

( * ) Notice: Subject to any disclaimer, the term of this patent is extended or adjusted under 35 U.S.C. 154(b) by 512 days.

(21) Appl. No.: 10/261,168

(22) Filed: Sep. 30, 2002

(51) Int. Cl.
*G06F 11/00* (2006.01)
*G06F 11/08* (2006.01)

(52) U.S. Cl. .............. 714/6; 714/15; 714/19; 711/162; 707/202; 707/204

(58) Field of Classification Search .............. 714/16, 714/17, 19, 20; 715/511
See application file for complete search history.

(56) References Cited

U.S. PATENT DOCUMENTS

| | | | | |
|---|---|---|---|---|
| 5,325,519 A * | 6/1994 | Long et al. | | 714/15 |
| 5,495,607 A * | 2/1996 | Pisello et al. | | 707/10 |
| 5,644,701 A * | 7/1997 | Takewaki | | 714/20 |
| 5,768,496 A * | 6/1998 | Lidgett et al. | | 714/25 |
| 5,873,101 A * | 2/1999 | Klein | | 707/204 |
| 5,905,506 A * | 5/1999 | Hamburg | | 345/672 |
| 6,016,553 A * | 1/2000 | Schneider et al. | | 714/21 |
| 6,047,294 A * | 4/2000 | Deshayes et al. | | 707/204 |
| 6,209,000 B1 * | 3/2001 | Klein et al. | | 707/203 |
| 6,434,681 B1 * | 8/2002 | Armangau | | 711/162 |
| 6,487,561 B1 * | 11/2002 | Ofek et al. | | 707/204 |
| 6,594,744 B1 * | 7/2003 | Humlicek et al. | | 711/152 |
| 6,618,794 B1 * | 9/2003 | Sicola et al. | | 711/154 |
| 6,665,815 B1 * | 12/2003 | Goldstein et al. | | 714/20 |
| 6,701,456 B1 * | 3/2004 | Biessener | | 714/20 |
| 6,732,125 B1 * | 5/2004 | Autrey et al. | | 707/204 |
| 6,771,843 B1 * | 8/2004 | Huber et al. | | 382/305 |
| 6,804,755 B2 * | 10/2004 | Selkirk et al. | | 711/165 |
| 6,892,211 B2 * | 5/2005 | Hitz et al. | | 707/202 |
| 6,915,397 B2 * | 7/2005 | Lubbers et al. | | 711/162 |
| 6,934,822 B2 * | 8/2005 | Armangau et al. | | 711/162 |
| 7,072,916 B1 * | 7/2006 | Lewis et al. | | 707/205 |
| 7,100,006 B2 * | 8/2006 | Durrant et al. | | 711/162 |
| 2001/0049704 A1 * | 12/2001 | Hamburg et al. | | 707/530 |

* cited by examiner

*Primary Examiner*—Scott Baderman
*Assistant Examiner*—Joseph Schell
(74) *Attorney, Agent, or Firm*—Daly, Crowley, Mofford & Durkee, LLP

(57) ABSTRACT

The present invention provides a method for providing snapshots of data at different times and for performing rollbacks to a selected snapshot that does not result in any subsequent snapshots being rendered unusable. The method includes a mapping mechanism wherein when a map entry for a block being written to for the first time during a session exists, then another map entry is created and all later sessions are applied to it. When a map entry for the block does not exist, a new map entry is provided and all prior sessions are applied to it.

14 Claims, 8 Drawing Sheets

PRESERVING SNAPSHOTS DURING DISK-BASED RESTORE

CROSS REFERENCE TO RELATED APPLICATIONS

Not Applicable.

BACKGROUND OF THE INVENTION

It is often times necessary and well known in the art to perform rollback operations. This is typically used when data has been corrupted, and it is desired to revert to an earlier form of the data that is uncorrupted. For instance, if a database were corrupted it would be desirable to roll back to an earlier uncorrupted version, and then update that version to bring it up-to date. It is well known to accomplish this rollback task by using snapshots of changes made to the data during a session. Sessions may be run daily and a snapshot (a point-in-time copy of the data) taken once a day, such that in the event a rollback is necessary, only a single day worth of changes have been lost. For example, if a snapshot is taken every night, and on Friday afternoon it is discovered that the database is corrupted, the database can be rolled back to the Thursday night data by way of the snapshot taken Thursday night. Steps can then be taken to update that copy. In such a manner only a single days worth of database updates are lost or may need to be reapplied.

One problem with performing rollbacks is that all snapshots which were taken after the snapshot which is rolled back to become unusable. Thus, if on a Friday it was discovered that the database is corrupted and needs to be rolled back to the Tuesday copy, the snapshots taken Wednesday and Thursday would be lost after the rollback to the Tuesday snapshot was performed. This is due to the mapping mechanism used to map changes to the data while creating the snapshot. Should it be later determined that a rollback to Wednesday copy would have been sufficient, that rollback cannot be accomplished since the Wednesday snapshot has been rendered unusable by the rollback to an earlier snapshot.

In view of the foregoing it would be desirable to provide a method of performing rollbacks that does not result in the destruction of later snapshots of the data.

SUMMARY OF THE INVENTION

With the foregoing background in mind, it is an object of the present invention to provide a method for providing snapshots of data at different times and for performing rollbacks to a selected snapshot which does not result in any subsequent snapshots being rendered unusable.

BRIEF DESCRIPTION OF THE DRAWINGS

The invention will be better understood by reference to the following more detailed description and accompanying drawings in which.

DETAILED DESCRIPTION

Figure 1:
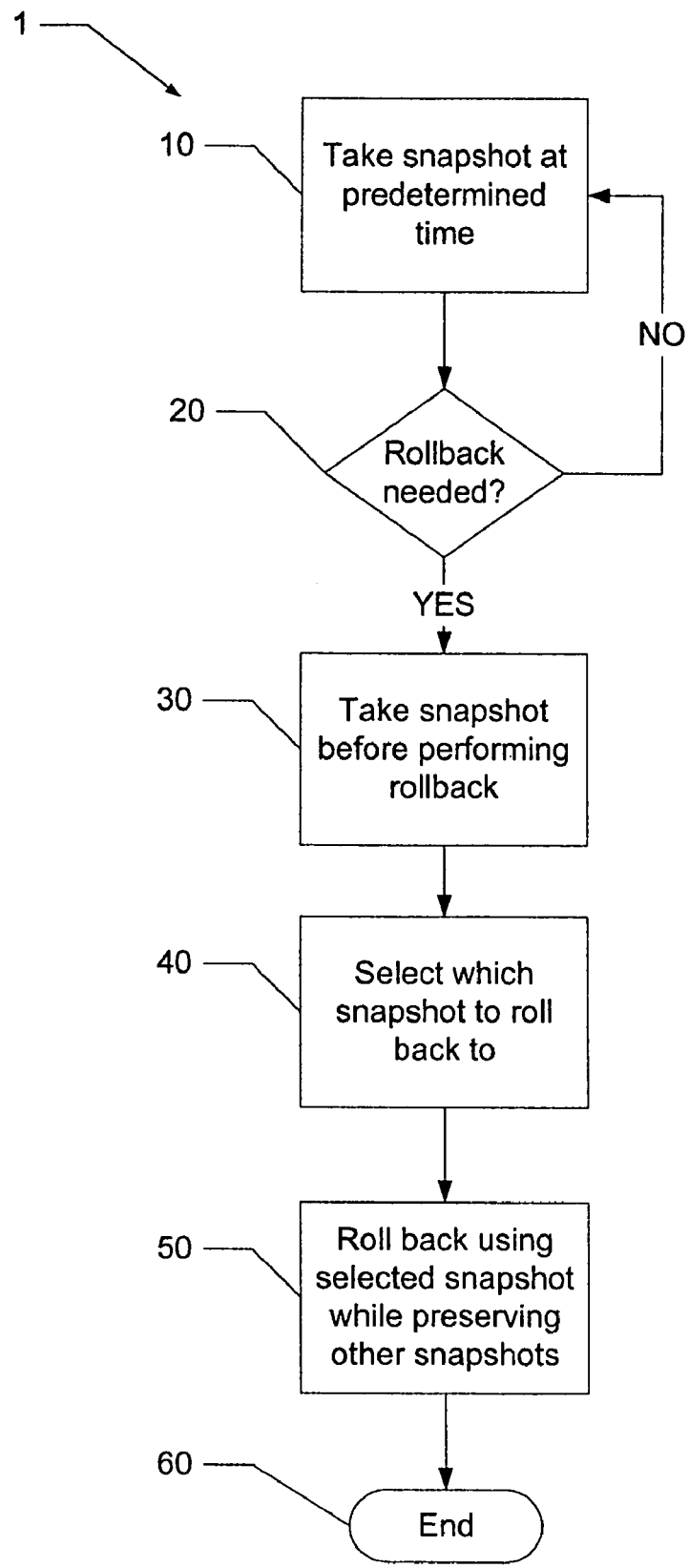
FIG. 1 is a flow chart of the present method.

The present invention provides a method of preserving snapshots during disk based restore operations. As part of the method, a mapping mechanism is used which allows for multiple sessions to be associated with the same block of data and allows for recovery of data while not rendering later snapshots unusable should a recovery from a later snapshot be desired.

Before describing the invention in detail it is necessary to define a few terms which are used throughout to describe the present invention.

A logical unit (LU) is one or more disk modules bound into a single entity, accessible by logical unit number, a hexadecimal number that becomes part of the disk-unit device name.

A snapshot is a logical point-in-time view of production information. Snapshots can be created quickly, and take up only a fraction of the original volume space. Snapshots allow for parallel access to production data and the point-in-time copy and further serve to minimize downtime for production data.

A source LU is an LU that contains real user data and can have one or more associated snapshot LUs defined for it.

A snapshot LU is a virtual construct which looks like an LU to a host, but is generated by the storage system using LUs, maps and snapshot storage areas.

A session starts when a snapshot is taken.

The disk storage used to hold the original data from a source LU that has been modified since the start of a session is known as the snapshot storage area. This storage is pre-allocated and used exclusively for snapshot purposes. The snapshot storage area can be comprised of multiple logical units; the logical units are then managed as a pool of space. The snapshot storage area is a collection of private LUs that store the original blocks of data when the source LU is written to.

Copy on First Write (COFW) is a methodology utilized to insure that the original version of source LU data is saved before being modified. This methodology requires that before the first modification, after the start of a session, the original data on the source LU is read and stored in the snapshot storage area. This methodology is only utilized with respect to the first modification of the data. Overwrite of any data that has already had a COFW does not require any extra processing since the original data was previously saved in the snapshot storage area.

Rollback is a mechanism for restoring to a set of source LUs the data from a specific point-in-time snapshot session on those LUs, so that the server's view of the source LUs immediately appears to match the data that was frozen at the specific point in time. Rollback is an operation that is invoked on a session with the intent of making the contents of the LUs in that session appear to have instantaneously reverted to what they looked like at an earlier time (namely, the time when that session was started). The ultimate result of rolling back an LU is to have all of the COFWed data (data that were "Copied on First Write" to a storage area LU) for that session to be flushed (copied back) to the source LU. The exception to this is that data that are written by the host after the start of the rollback operation does not get copied back, since the new host data supersedes the original session data. Thus, even though sessions may be active on an LU during a rollback operation and new data may be constantly being COFWed into storage area all that time, no new data will be added to the set of data to be rolled back once the rollback operation begins.

Referring now to FIG. 1, a flow chart of the presently disclosed method is depicted. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The first step 10 of method 1 recites that snapshots are taken at predetermined times and are saved. The taking of snapshots involves performing COFW operations on the data during a session.

Figure 2:
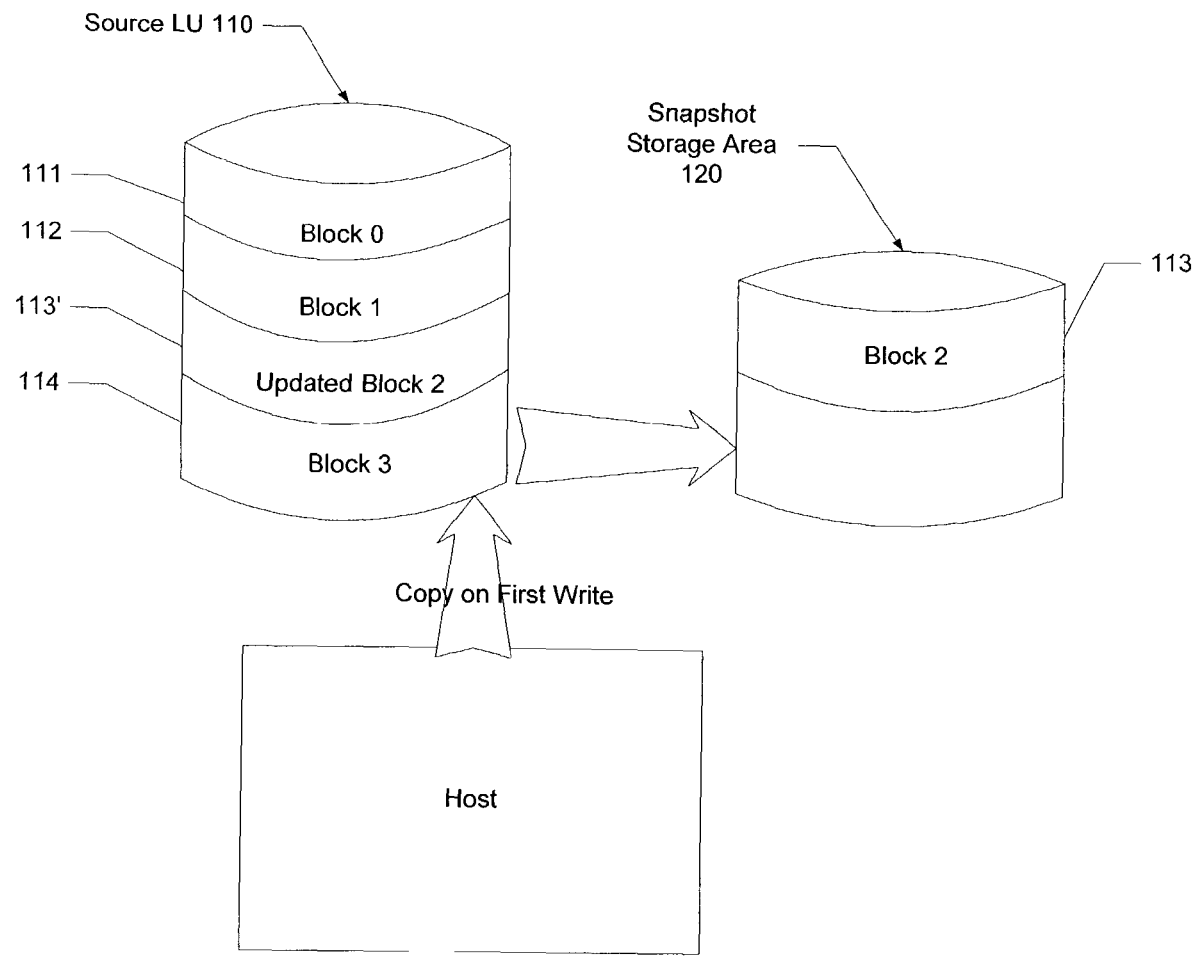
FIG. 2 is a diagram showing a Copy on First Write (COFW) operation.

Referring now to FIG. 2, a diagram showing a COFW operation is presented. As recited above, a session performs COFW writes of data to create the snapshot. As shown in FIG. 2, a source LU 110 includes four blocks, block 0 (111), block 1 (112), block 2 (113) and block 3 (114). When a write to block 2 is performed the original data in block 2 (data 113) is copied to the snapshot storage area 120. The block 2 data is then overwritten with the new data (113').

Figure 3:
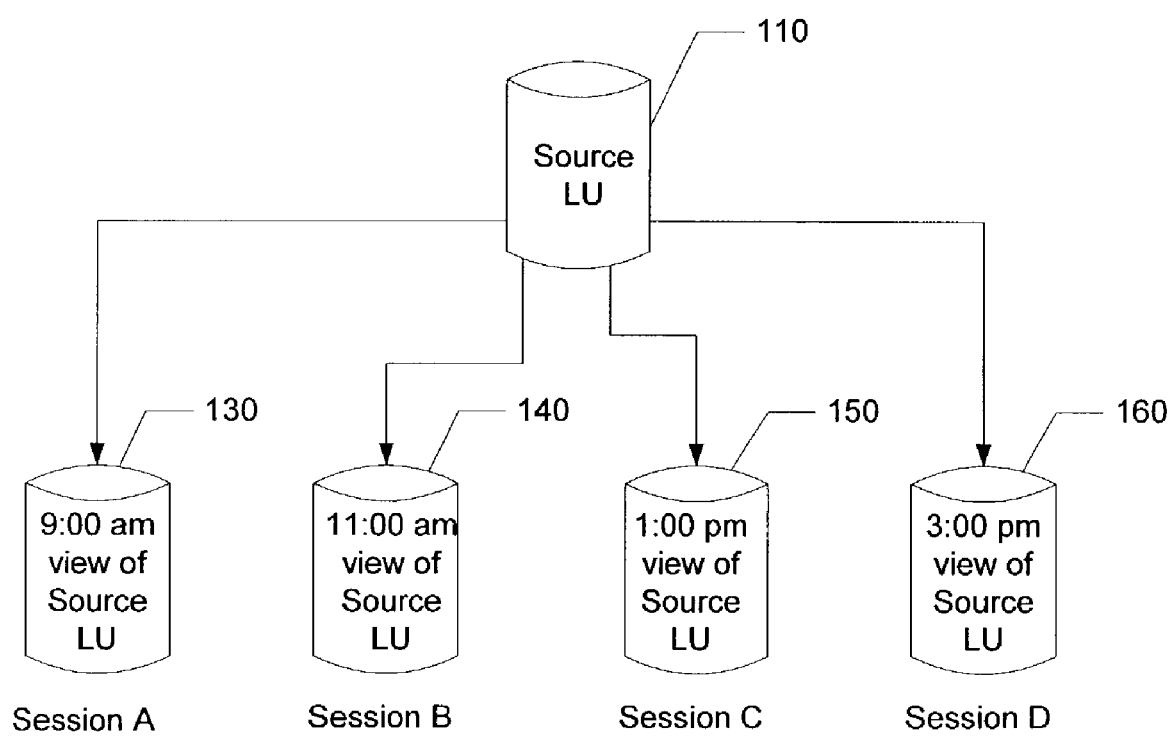
FIG. 3 is a diagram showing a source LU and multiple snapshots of the LU.

Referring now to FIG. 3, a diagram is shown wherein multiple sessions have been run on a source LU 110. The first session (Session A) was a 9:00 am snapshot 130 of source LU 110. Session B is an 11:00 am snapshot 140 of source LU 110. A session C 1:00 pm snapshot 150 of source LU 110 is shown as is a 3:00 pm view 160 of source LU 110.

Figure 4:
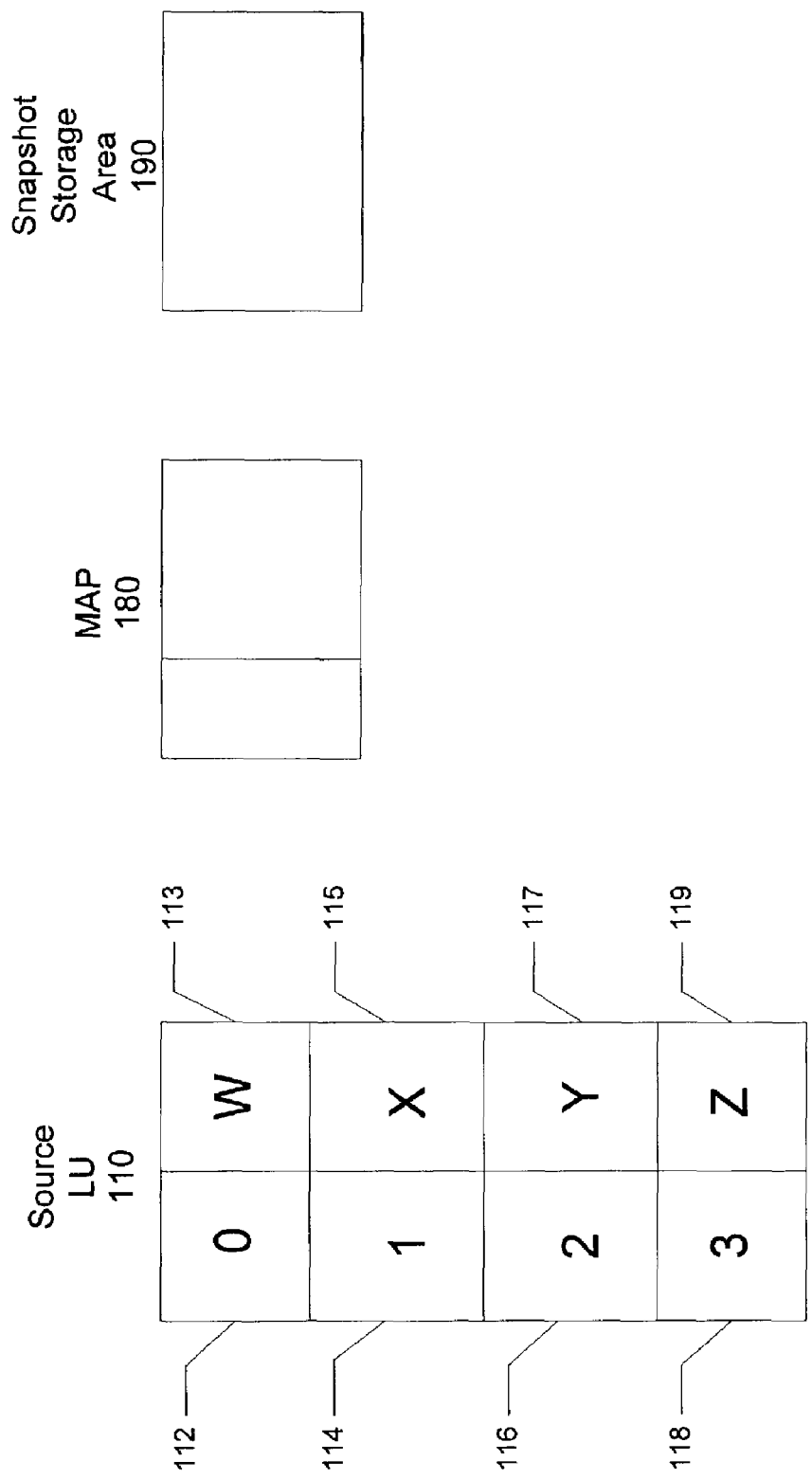
FIG. 4 is a diagram showing a source LU, a map and a snapshot storage area prior to a session.

Referring now to FIG. 4, a diagram showing how the snapshot is provided is shown. The source LU 110 is shown in this example containing four blocks: block 0 (112), block 1 (114), block 2 (116) and block 3 (118). For simplicity, only four blocks are used in this example. However, it should be appreciated that large numbers of blocks are typically involved. Similarly, only three sessions are used in this example but up to eight sessions can be used. Referring to the source LU 110: block 0 contains data W (113), block 1 contains data X (115), block 2 contains data Y (117) and block 3 contains data Z (119). Also shown are a data map 180 and a snapshot storage area 190. These are the initial conditions. Since no COFW operations have occurred yet, map 180 and storage area 190 are blank.

Figure 5:
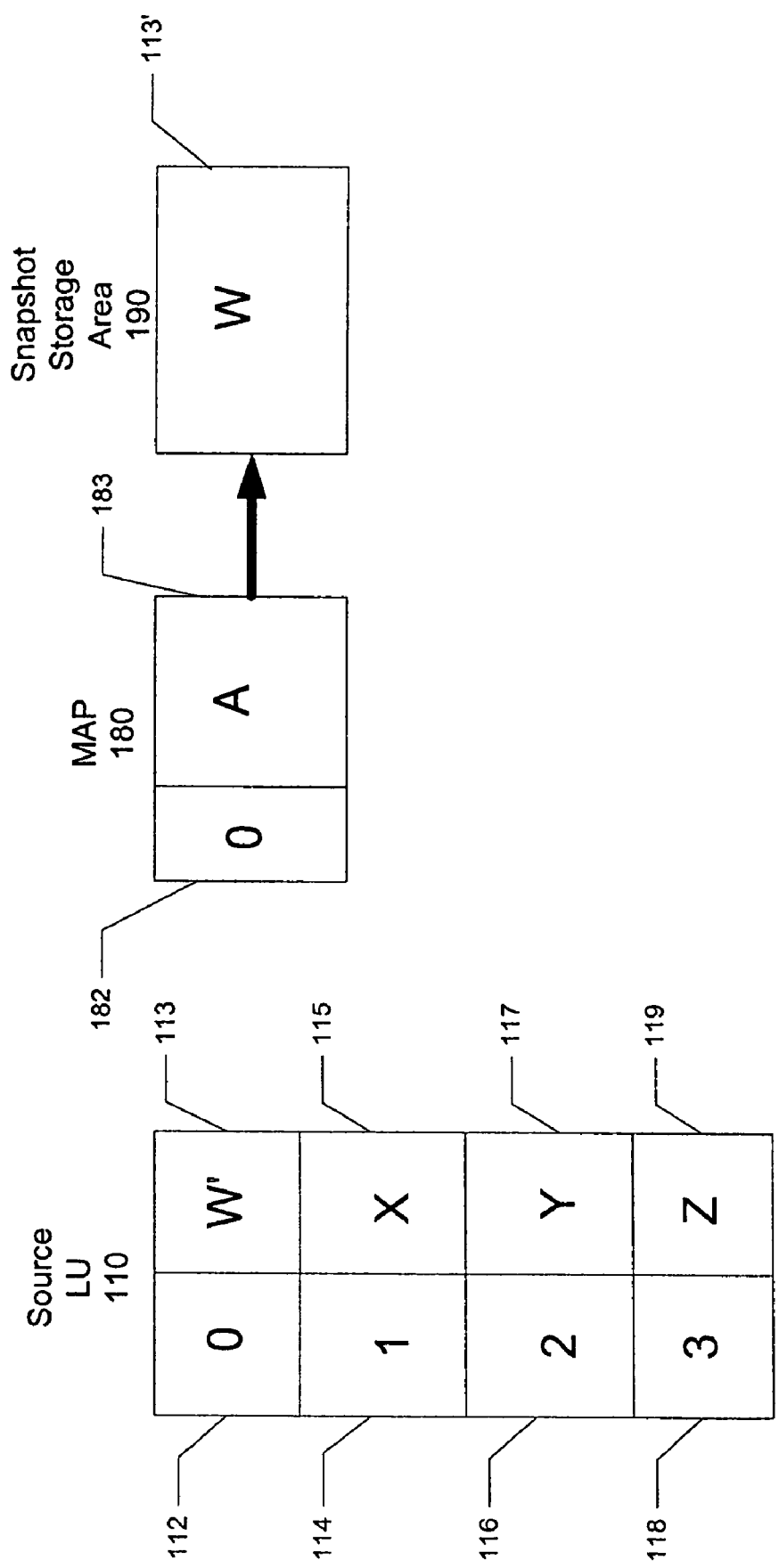
FIG. 5 is a diagram showing the source LU, the map and the snapshot storage area after a first session.

At FIG. 5, a first session (session A—9:00 am) is started. Between 9:00 and 11:00 block 0 (112) has had its data changed from W to W' (113). The map 180 has an entry to show this change to the data. The entry (182) shows block 0 and the associated session (183 session A) and points into the storage area to the original data that was in block 0 (data W 113'). While the prior art uses a relatively simple mapping mechanism, the present invention utilizes a more complex mapping mechanism which provides data in a manner such that a rollback to a particular snapshot does not render all subsequent snapshots unusable. The mapping mechanism of the present invention utilizes a set of rules to produce the map entry and pointer to the storage area. On a COFW operation, when a map entry for the block exists, then another map entry is created and all later sessions are associated with it. When a map entry for the block does not exist, a new map entry is provided and all prior sessions are associated with it. In this instance, a map entry for block 0 did not exist, therefore a new map entry for block 0 was provided and session A was associated with this entry.

Figure 6:
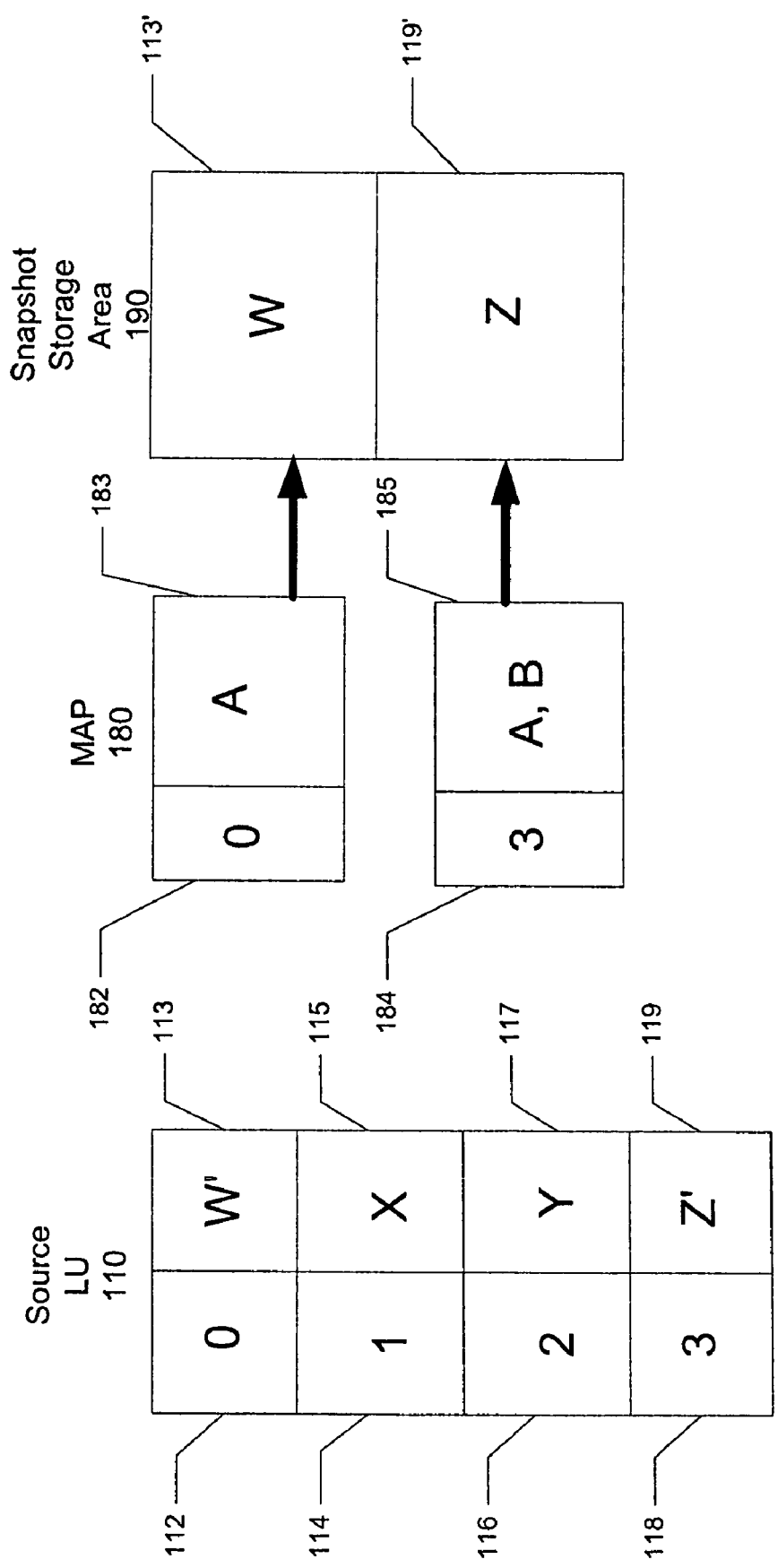
FIG. 6 is a diagram showing the source LU, the map and the snapshot storage area after a second session.

Referring now to FIG. 6, a second session has taken place (session B the 11:00 am session). During this second session block 3 (118) is modified from Z to Z'. A second map entry (184) is provided in accordance with the mapping mechanism. In this instance, a map entry for block 3 did not exist, therefore a new map entry for block 3 was provided and session A and session B were associated with this entry, which points only to the original data Z (119') for block 3.

Figure 7:
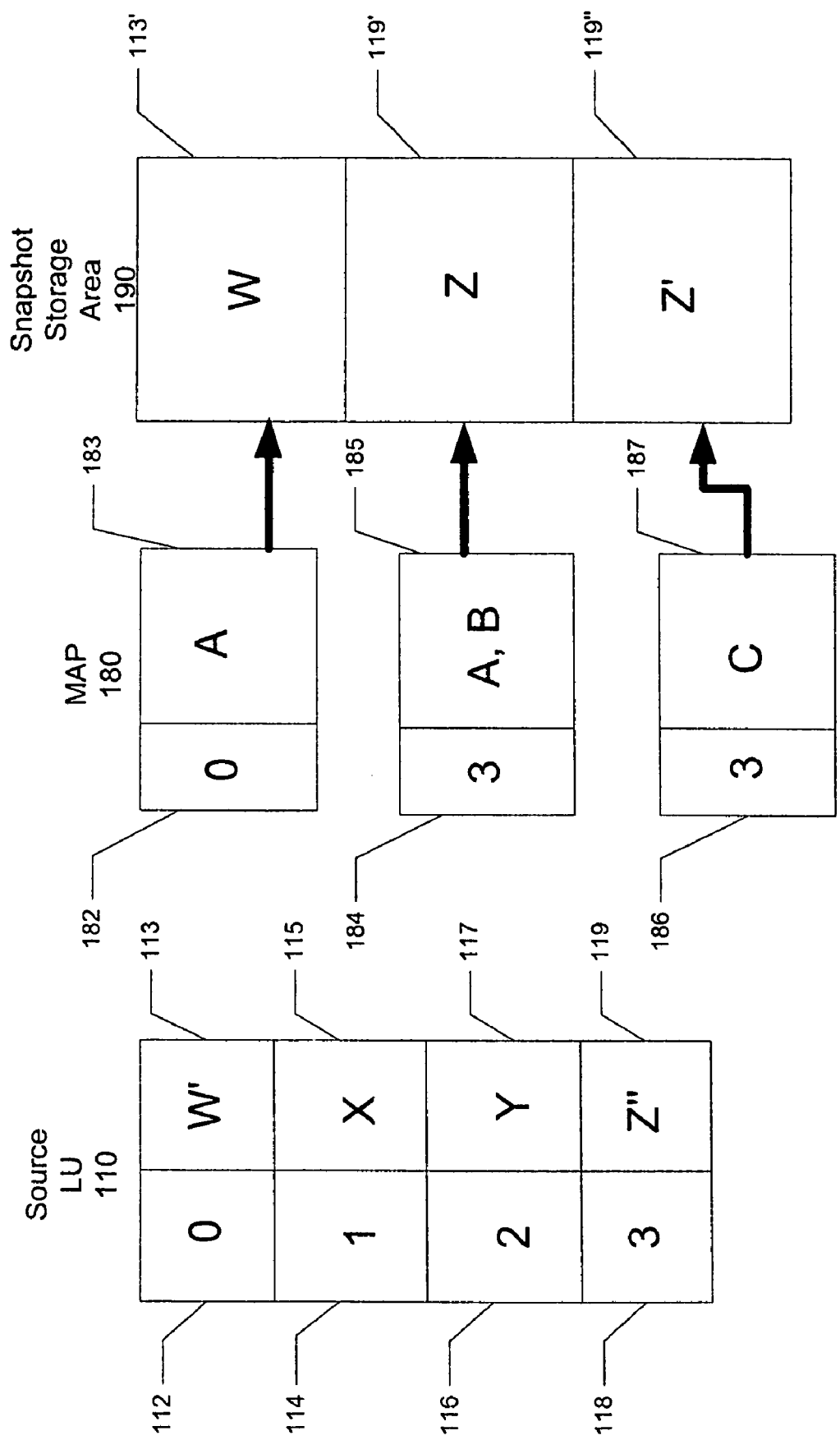
FIG. 7 is a diagram showing the source LU, the map and the snapshot storage area after a third session.

FIG. 7 shows a third session (session C) starting at 1:00 pm. During this session block 3 (118) is modified from Z' to Z". A map entry for this change is done in accordance with the mapping rules. In this instance a map entry for the block already exists, therefore another map entry for the block is created and all later sessions are associated with it. Accordingly, map entry 186 is provided which lists block 3 and is associated with session C. This entry points to the data Z' (119") in the storage area 190.

Figure 8:
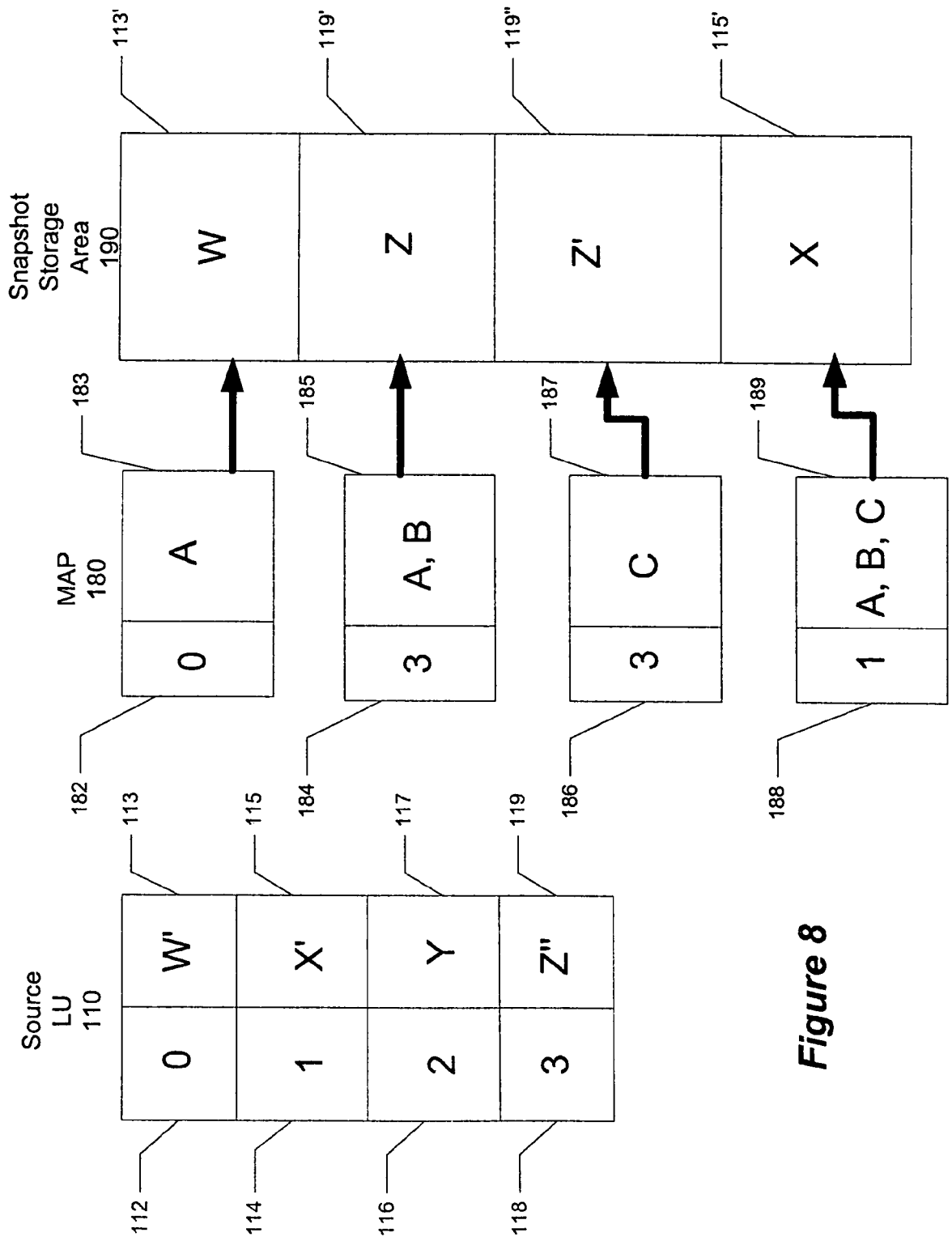
FIG. 8 is a diagram showing the source LU, the map and the snapshot storage area of all sessions.

FIG. 8 shows a final snapshot session wherein block 1 (114) was modified to contain X'. In accordance with the mapping rules, a new map entry (188) is produced for block 1. In this instance, a map entry for block 1 did not exist, therefore a new map entry for block 1 was provided and all earlier sessions (session A, session B and session C) were associated with this entry which points to the original data X (115') for block 1.

Referring back to FIG. 1, following step 10, step 20 is executed wherein a determination is made regarding whether a rollback operation should be performed. When there is not a need to perform a rollback operation, then steps 10 and 20 are repeated. When it is determined that a rollback operation should be performed, the method continues at step 30.

At step 30 a snapshot is taken at the present time. This provides a snapshot of the data right before the rollback operation begins.

The next step executed is step 40 wherein a determination is made as to which snapshot to roll back to. A rollback operation can be performed using any of the snapshots taken during execution of step 10.

Step 50 is performed next. At step 50 a rollback is performed using the snapshot selected in step 40. With the source LU 110, map 180 and snapshot storage area 190, a rollback to any of the prior snapshots is possible. For example, referring now to FIG. 8, if it was desired to roll back to the data beginning at session C, the rollback operation would search through the map entries to find sessions entries, which include session C. Thus, entry 188 and entry 186 contain session id C. Source LU 110 block 1 would be rewritten with the original data indicated by pointer for map entry 188, and data X (115') would be written into block 1 (114) of source LU 110. Similarly, the data pointed to by map entry 186, data Z' (119") is written into block 3 (118) of source LU 110. After the rollback operation, source LU 110 would then contain the following data: block 0 W", block 1 X, block 2 Y, and block 3 Z' which is what the data was at the start of session C.

A rollback to session A would take place as follows. Map 180 is searched for entries having session A. Entries 182, 184, and 188 qualify. Source LU 110 block 0 is written with the data pointed to by entry 182, therefore data W is written into source LU 110 block 0 (112). Source LU 110 block 3 is written with the data pointed to by entry 184, therefore data Z is written into source LU 110 block 3 (118). Source LU 110 block 1 is written with the data pointed to by entry 188, therefore data X is written into source LU 110 block 1 (114). Source LU 110 would then contain the following data: block 0 W, block 1 X, block 2 Y and block 3 Z which is what the data was at the start of session A.

If it was determined that it was necessary to roll back to session B, then a similar procedure would be followed. The map would be searched for instances of session B. Entries 184 and 188 thus qualify. Source LU 110 block 3 (118) would be rewritten with the original data indicated by the pointer for map entry 184, and data Z (119) would be written into block 3 (118) of source LU 110. Similarly, the data pointed to by map entry 188 (data X) is written into block 1 (114) of source LU 110. Source LU 110 would then contain the following data: block 0 W', block 1 X, block 2 Y, and block 3 Z. This is what the data was at the start of session B.

The completion of the rollback operation results in the data being restored to an earlier point-in-time version of the data, and results in the end of the process as shown in step 60 of FIG. 1. Unlike the prior art, all the other snapshots are also usable, thus if it is desired to roll back using another snapshot, the rollback can also be performed.

The rollback process cannot take place instantaneously, so the rollback and snapshot drivers intercept and processes read and write requests issued by the host during this period, during which the LU is termed to be "rolling back." When the restoring is complete, the LU is said to have finished rolling back, so I/Os to the LU can resume normal processing, with no special rollback intervention required. When all of the LUs in the session being rolled back have finished, the rollback operation as a whole is likewise deemed complete.

The above-described method thus provides a manner for producing snapshots of data at different times and for performing rollbacks to a selected snapshot which does not result in any snapshots being rendered unusable such that other rollback operations using different snapshots can be performed.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of performing non-destructive rollback comprising:
   taking a first snapshot of a set of source logical unit blocks at a first time;
   taking a second snapshot of the set of source logical unit blocks at a second time later than the first time, taking the first snapshot or taking the second snapshot comprises:
   starting a session; and
   performing a Copy on First Write (COFW) operation on data being written to for the first time during the session, performing the COFW operation comprises:
   providing a map entry for a logical unit block being written to;
   storing data contained in the logical unit block to a snapshot storage area; and
   providing a pointer from the map entry to the data in the snapshot storage area;
   performing a rollback to the first snapshot; and
   preserving the second snapshot, the second snapshot may be used for a subsequent rollback;
   wherein providing the map entry comprises determining if the map entry for the block being written to already exists and if the map entry does exist, producing another map entry configured to associate all later sessions to the another map entry.

2. The method of claim 1, further comprising:
   taking a third snapshot at a third time later than the second time; and
   preserving the third snapshot prior to performing the rollback;
   wherein the third snapshot may be used for the subsequent rollback.

3. The method of claim 1, further comprising:
   taking a third snapshot at a third time prior to the first time; and
   preserving the third snapshot;
   wherein the third snapshot may be used for the subsequent rollback.

4. The method of claim 1 wherein providing the map entry comprises if the map entry does not exist, producing a new map entry and associating prior sessions to the new map entry.

5. The method of claim 1 wherein providing the map entry comprises providing the map entry having at least one session associated with the map entry.

6. The method of claim 1, further comprising taking additional snapshots between the first time and the second time.

7. The method of claim 6, further comprising preserving the additional snapshots;
   wherein the additional snapshots may be used for the subsequent rollback.

8. An article comprising a readable memory device that stores executable instructions for performing non-destructive rollback, the instructions causing the machine to:
   take a first snapshot of a set of source logical unit blocks at a first time;
   take a second snapshot of the set of source logical unit blocks at a second time later than the first time, the instructions causing the machine to take the first snapshot or the second snapshot comprises instructions causing the machine to:

start a session; and perform a Copy on First Write (COFW) operation on data being written to for the first time during the session, the instructions causing the machine to perform the COFW comprises instructions causing the machine to:

provide a map entry for a logical unit block being written to;

store data contained in the logical unit block to a snapshot storage area; and provide a pointer from the map entry to the data in the snapshot storage area;

perform a rollback from the first snapshot; and preserve the second snapshot, the second snapshot may be used for a subsequent rollback;

wherein the instructions causing the machine to provide the map entry comprises instructions causing the machine to determine if the map entry for the block being written to already exists and if the map entry does exist, causing the machine to produce another map entry configured to associate all later sessions to the another map entry.

9. The article of claim 8, further comprising instructions causing the machine to:

take a third snapshot at a third time later than the second time; and preserve the third snapshot prior to performing the rollback;

wherein the third snapshot may be used for the subsequent rollback.

10. The article of claim 8, further comprising instructions causing the machine to:

take a third snapshot at a third time prior to the first time; and preserve the third snapshot;

wherein the third snapshot may be used for the subsequent rollback.

11. The article of claim 8 wherein the instructions causing the machine to provide the map entry comprises instructions causing the machine to, if the map entry does not exist, produce a new map entry and associating all prior sessions to the new map entry.

12. The article of claim 8 wherein the instructions causing the machine to provide the map entry comprises instructions causing the machine to provide the map entry having at least one session associated with the map entry.

13. The article of claim 8, further comprising instructions causing the machine to take additional snapshots between the first time and the second time.

14. The article of claim 13, further comprising instructions causing the machine to preserve the additional snapshots;

wherein the additional snapshot may be used for the subsequent rollback.

\* \* \* \* \*

UNITED STATES PATENT AND TRADEMARK OFFICE
CERTIFICATE OF CORRECTION

| | |
|---|---|
| PATENT NO. | : 7,206,961 B1 |
| APPLICATION NO. | : 10/261168 |
| DATED | : April 17, 2007 |
| INVENTOR(S) | : Mutalik et al. |

It is certified that error appears in the above-identified patent and that said Letters Patent is hereby corrected as shown below:

Column 1, line 15, delete "corrupted it" and replace with -- corrupted, it --.

Column 1, line 27, delete "manner only" and replace with -- manner, only --.

Column 1, line 38, delete "to Wednesday" and replace with -- to the Wednesday --.

Column 1, line 42, delete "foregoing it" and replace with -- foregoing, it --.

Column 1, line 43, delete "that does" and replace with -- that do --.

Column 2, line 65, delete "that were" and replace with -- that was --.

Column 2, line 67, delete "that are" and replace with -- that is --.

Column 3, line 5, delete "into storage" and replace with -- into the storage --.

Column 3, line 31, delete "stated the" and replace with -- stated, the --.

Column 3, line 44, delete "performed the" and replace with -- performed, the --.

Column 4, line 2, delete "11:00 block 0" and replace with -- 11:00, block 0 --.

Column 4, lines 22-23, delete "session block 3" and replace with -- session, block, 3 --.

Column 4, line 30, delete "session block 3" and replace with -- session, block 3 --.

Column 4, line 60, delete "step 50 a" and replace with -- step 50, a --.

Column 4, lines 66-67, delete "sessions entries" and replace with -- session entries --.

Column 5, lines 57-58, delete "invention it" and replace with -- invention, it --.

UNITED STATES PATENT AND TRADEMARK OFFICE
CERTIFICATE OF CORRECTION

PATENT NO. : 7,206,961 B1
APPLICATION NO. : 10/261168
DATED : April 17, 2007
INVENTOR(S) : Mutalik et al.

It is certified that error appears in the above-identified patent and that said Letters Patent is hereby corrected as shown below:

Column 5, line 67, delete "submitted that that the" and replace with -- submitted that the --.

Signed and Sealed this

Twenty-seventh Day of November, 2007

JON W. DUDAS
*Director of the United States Patent and Trademark Office*